J. A. TROWBRIDGE, Jr.
CAP FOR STORAGE TANKS.
APPLICATION FILED OCT. 9, 1914.
1,166,021.
Patented Dec. 28, 1915.
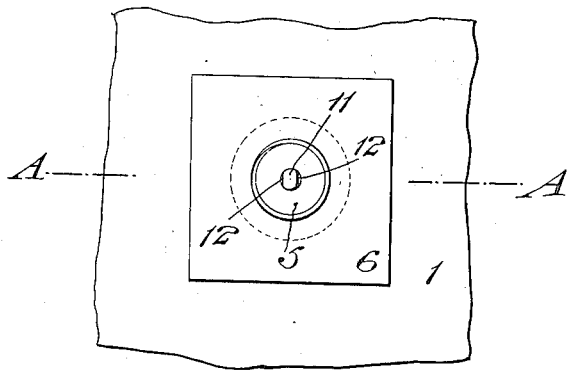
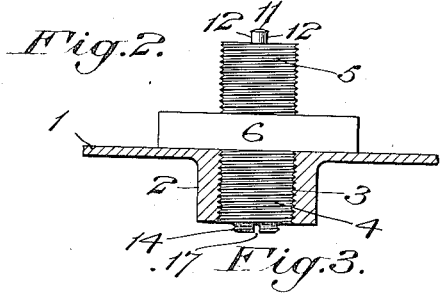
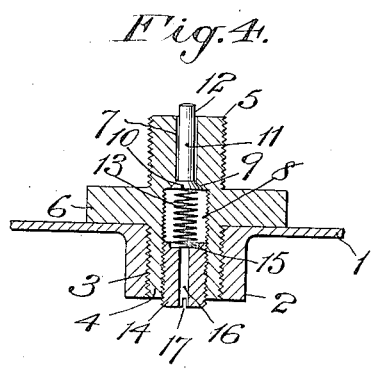
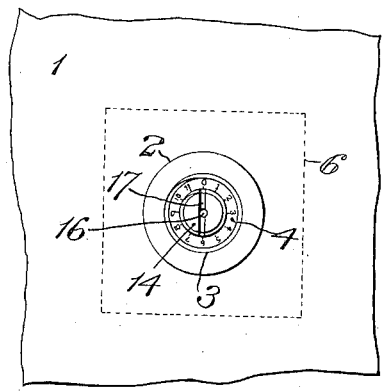
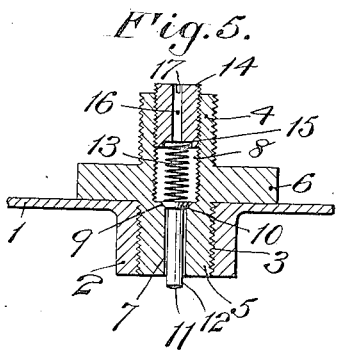
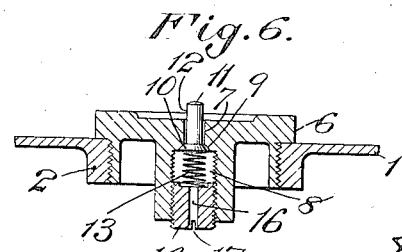
Witnesses:
Hyperion Barry.
F. George Barry.
Inventor:-
James A. Trowbridge Jr.
by attorneys

UNITED STATES PATENT OFFICE.

JAMES A. TROWBRIDGE, JR., OF NOROTON, CONNECTICUT.

CAP FOR STORAGE-TANKS.

1,166,021.    Specification of Letters Patent.    Patented Dec. 28, 1915.

Application filed October 9, 1914. Serial No. 865,952.

*To all whom it may concern:*

Be it known that I, JAMES A. TROWBRIDGE, Jr., a citizen of the United States, and resident of Noroton, in the county of Fairfield and State of Connecticut, have invented a new and useful Improvement in Caps for Storage-Tanks, of which the following is a specification.

This invention relates to an improvement in relief caps for storage tanks used for containing volatile and highly explosive liquids, such as gasolene, benzin or naphtha, with the object in view of providing a cap having a valve structure therein which may be used in tanks wherein the gases cannot escape and the formation of a vacuum is prevented. The cap may also be used in connection with a pressure tank in which the excess pressure within the tank may be released to prevent an explosion.

Another object is to provide a means for adjusting the valve to resist more or less pressure within the tank.

Another object is to provide a means whereby the valve may be adjusted so as to maintain a partial vacuum in the tank.

A practical embodiment of my invention is represented in the accompanying drawings, in which, Figure 1 represents a plan view of a portion of a tank with the cap and relief valve applied as used in connection with a gasolene storage receptacle. Fig. 2 represents a side elevation of the cap, showing a portion of a tank in section. Fig. 3 represents an inverted plan of the same. Fig. 4 represents a transverse section taken in the plane of the line A—A of Fig. 1. Fig. 5 represents a transverse section showing the cap and valve in position when used in a pressure tank, and Fig. 6 represents a modified form of cap and valve.

The storage tank or receptacle is denoted by 1 and is provided with a flanged inlet 2, which is screw-threaded at 3, for the reception of a threaded shank 4, as shown in Figs. 1 to 4 inclusive, or a threaded shank 5, as shown in Fig. 5, both of which shanks are formed integral with the head 6 of the cap.

The shank 4 is provided with a tubular bore 7 which merges into a screw-threaded larger bore 8 in the head 6 and shank 5. Between the bores 7 and 8, a valve seat 9 is formed for the reception of a valve 10 having a stem 11 which is fitted in the bore 7 for centering the valve 10 on its seat. The stem 11 is flattened or cut away at 12, to form a free passage through the bore 7 past the valve 10, either as an intake or an escape for the air or fluid. The valve 10 is yieldingly held upon its seat by a spring 13, the tension of which is adjusted by means of a screw 14 having a threaded engagement with the bore 8. The screw 14 is provided with a recess 15 forming a seat for the spring 13, and also has a hole 16 passing centrally therethrough. The screw 14 may be turned into and out of the bore 8, by means of a screw-driver engaging the kerf 17. To facilitate the proper adjustment or tension of the spring 13, I provide the face of the shank 4 with a series of marks or lines, in the present instance from 0 to 11 in a circle, and with the kerf as an indicator, the screw may be rotated to a degree and the tension on the spring adjusted as desired.

When the cap is used in connection with a pressure tank, the threaded shank is inserted into the flanged inlet 2, in which position the valve stem 11 depends into the tank 1 and the adjusting screw 14 with its kerf and the marks on the face of the shank 4 are in plain view of the operator. In this position the pressure may be regulated while in actual operation. When the cap is used as shown in Figs. 1 to 4 inclusive and in Fig. 6, the tension on the valve must be adjusted before insertion into the tank. In this position the liquid upon being withdrawn from the tank 1, will form a partial vacuum within the tank until the tension of the spring 13 is overcome, whence the valve opens. The air then passes through the smaller bore 7 and the flattened portion 12 of the stem 11 into the larger bore 8 and through the hollow screw 14 into the tank 1.

The valve stem 11 is made long enough to extend above the shank 5, so that the valve may be manually operated to bring the tank to atmospheric pressure without removing the cap.

It is obvious that various changes may be resorted to in the form, construction and arrangement of the several parts without departing from the spirit and scope of my invention and hence I do not wish to limit myself strictly to the construction herein shown and described, but

What I claim is:

1. A relief cap for storage tanks comprising a head and a screw-threaded shank, tubular bores therethrough, a valve seat between said bores of different diameters in alinement, a valve for said seat having a flattened stem mounted in the smaller bore, a spring for the valve located in the larger bore, and a hollow screw directly engaging said spring, said screw having a threaded engagement with the larger bore for adjusting the tension of the spring.

2. A relief cap for storage tanks comprising a head and an interiorly and exteriorly screw-threaded shank, tubular bores of different diameters in alinement therethrough, a valve and seat located between said bores, a flattened stem for said valve mounted in the smaller bore, a spring for the valve in the larger bore, a kerfed hollow screw directly engaging said spring, said screw having a threaded engagement with the larger bore, and a dial upon the face of said shank adapted to register with the kerf on the hollow screw for visibly determining the tension of said spring.

In testimony, that I claim the foregoing as my invention, I have signed my name in presence of two witnesses, this twenty-sixth day of September, 1914.

JAMES A. TROWBRIDGE, Jr.

Witnesses:
F. GEORGE BARRY,
C. S. SUNDGREN.